United States Patent [19]

Miller

[11] 3,955,972

[45] May 11, 1976

[54] METHOD OF PRODUCING SHEETS AND ARTICLE TO PRACTICE SUCH METHOD

[75] Inventor: Gary E. Miller, Monroeville, Pa.

[73] Assignee: Atlantic Richfield Company, Los Angeles, Calif.

[22] Filed: May 13, 1974

[21] Appl. No.: 468,971

Related U.S. Application Data

[62] Division of Ser. No. 566,603, July 20, 1966, Pat. No. 3,827,264.

[52] U.S. Cl. .................................. 75/129; 75/53; 75/93 G
[51] Int. Cl.² ..................... C22C 33/00; C22B 9/10
[58] Field of Search ................ 75/129, 53, 58, 93 G

[56] References Cited
UNITED STATES PATENTS

| | | | |
|---|---|---|---|
| 654,984 | 7/1900 | Johnson | 75/93 G |
| 1,848,323 | 3/1932 | Davies | 75/53 |
| 3,681,050 | 8/1972 | Ueki | 75/53 |
| 3,754,899 | 8/1973 | Kanter | 75/129 |

FOREIGN PATENTS OR APPLICATIONS

| | | | |
|---|---|---|---|
| 878,429 | 9/1961 | United Kingdom | 75/93 G |

*Primary Examiner*—Peter D. Rosenberg
*Attorney, Agent, or Firm*—Coleman R. Reap

[57] ABSTRACT

This invention relates to the art of reducing metallic bodies from a greater thickness to a substantially smaller thickness and has particular relationship to such reduction of stainless steel containing substantial quantities of boron, typically in the fabrication of sheets for nuclear reactor control rods.

2 Claims, 8 Drawing Figures

MELT I-PLATE 4-END I

MELT I-PLATE 4-END 2

MELT I-PLATE 5-END I

MELT I-PLATE 5-END 2

MELT I-PLATE 6-END I

MELT I-PLATE 6-END 2

METHOD OF PRODUCING SHEETS AND ARTICLE TO PRACTICE SUCH METHOD

This is a division of application Ser. No. 566,603, filed July 20, 1966, now U.S. Pat. No. 3,827,264.

Control rods are typically composed of plates fabricated into an elongated structure of cruciform cross section. To control the reactivity of a reactor the cruciform structure is slid in and out of the reactor body. Of the elements, which are readily usable for control rod purposes, boron, and specifically, boron 10 (B10) has a high absorption cross section, $\sigma\ abs$. It is then desirable that control rods be formed of a material or alloy containing substantial quantities of boron 10 and it is an object of this invention to provide plates for control rods of such a material. Specifically, stainless steel lends itself readily to use in the corrosive surroundings of a reactor and it is an object of this invention to provide such plates of a stainless steel containing substantial quantities of boron 10. The content of B10 in naturally occurring boron is only 18.83 percent. For control rod use it is necessary that the enrichment of B10 be about 90 percent. Such enriched boron is available but it is costly. Typically, the enriched boron is supplied in the form of a fine powder costing between about $4.00 and $6.00 per gram. In the interest of economy it is essential that in the producing of the alloy and in the fabrication of plates for the control rods loss of B10 be minimized and it is an object of this invention to accomplish this desideratum.

Typically, the stainless steel alloy for producing control rods contains up to 2.3 percent or 2.5 percent B10 and is produced in the form of billets or slabs having a thickness of about 1.3 inches; typically 1⅛ inches thick × 5 inches wide × 12 inches long. It is necessary that the slabs be reduced to plates or sheets having a thickness of about 0.350 inches. Typically, sheets or plates having the following dimensions are required.

```
Thickness    0.312"  ±.003"
Width        4.125"  +.000"
                     −.015"
Length       36.00"  +.000"
                     −.030"
```

The maximum TIR (Total Indicated Runout) is 0.010 over the 36 inches length. Attempts have been made to produce these plates by rolling the slabs directly in a rolling mill but these attempts have not produced satisfactory sheets. The sheets produced were cracked at the edges. Both opposite surfaces of the sheets fabricated in this manner had regions from which the B10 was depleted extending to a depth of about 0.070 inches from each surface. Boron or borides was released from the slabs during the rolling and was deposited on surfaces throughout the shop where the rolling was carried out. In a nuclear fabrication shop the boron is deposited on materials being prepared for use in reactors. Such materials have a tolerance of only 1 or 2 parts per million of boron and the deposit of boron on their surfaces would poison the reactors, further the depletion of the boron resulted in gross inhomogeneities in the boron distribution.

It is an object of this invention to overcome the above-described difficulties and to produce boron-containing stainless steel sheets by reduction of slabs without spread of contaminating boron throughout the reduction shop, which sheets shall be homogenious in boron distribution, shall not be cracked at the edges and shall not have surfaces depleted of boron. Typically the homogeniety shall be better than ±5 percent relative boron content in analysis of specimens taken from different parts of the sheet.

While this object is in the practice of this invention achieved for stainless steel containing B10, it is applicable to stainless steel containing boron of only isotopic compositions and the fabrication of such steel containing any such composition of boron is within the scope of this invention.

This invention arises from the realization that the cracking and the depletion of boron at the surfaces are caused by the reaction of the slab material with the oxygen in the atmosphere. The boron in the alloy is in the form of complex borides and the borides react with air to produce the harmful effects of the steel. The boron is also released from the steel probably in the form of fine oxide particles to produce contamination of the shop.

In accordance with this invention the reduction is carried out with the stainless steel confined in cladding of mild carbon steel. Each slab is coated with a wash of a material, typically, zirconia, which prevents the slab surface from sticking to mild steel and is then sealed in a pocket of mild steel. The composite pack is then reduced by repeated rolling to the desired thickness. Prior to each rolling operation the pack is heated to 1125°C ± 50°C. It is essential that the temperature shall not exceed about 1165°C. during the heating because the boron-containing stainless steel exhibits hot-shortness and deteriorates above 1165°C. During the rolling it is essential that the temperature shall not fall below about 1075°C. because at this temperature the boron-containing steel becomes brittle and cannot be rolled. The pack according to this invention has the additional advantage that it retains the heat longer than a slab of the stainless steel and thus facilitates the rolling. The cladding also constrains the slab and prevents edge cracking.

In producing boron containing stainless steel, typically, type AISI 304 stainless steel, is melted with a requisite quantity of 90 percent enriched B10 powder in a vacuum furnace. Where low carbon is essential type 304L steel may be used. The following Table I presents the nominal composition of the alloy elements in percent of 304 steel and the actual analyzed composition in alloy elements of such steel used in the typical practice of this invention.

TABLE I

|  | C | Mn | P | S | Si | Ni | Cr | Mo | Co | Cu |
|---|---|---|---|---|---|---|---|---|---|---|
| Nominal | .08 | 2.00 | .045 | .030 | 1.00 | 8.00 to 12.00 | 18.00 to 20.00 | | | |
| Actual | .072 | 1.51 | .021 | .013 | .62 | 8.38 | 18.43 | .28 | .10 | .36 |

The remainder for each row is iron.

Typically, the boron which is melted with such steel has the composition given in the following Table IA.

TABLE IA

| Lot No. | NB-4 | NBL-1 | NBL-3 | NBL-4 | NBL-5 |
|---|---|---|---|---|---|
| Total Boron Niagara Analysis | 88.81 | 90.83 | 91.50 | 91.73 | 89.51 |
| Total Boron NUMEC Analysis | 88.46 88.36 | | 91.58 91.63 | | |
| Isotopic B-10 Niagara Analysis | 90.02 | 91.70 | 91.40 | 91.00 | 91.14 |
| C | 1.85 | | | | |
| O | 1.10 | | | | |
| H$_2$O | 0.37 | | | | |
| Ti | 0.09 | | | | |
| Ca | 0.75 | | | | |
| Mg | 0.001 | | | | |
| Cr | 0.007 | | | | |
| Cu | 1.19 | | | | |
| Fe | 0.110 | | | | |
| Mn | 0.028 | | | | |
| Ni | 1.20 | | | | |
| Si | 2.2 | | | | |
| Pb | 0.004 | | | | |
| K | 0.30 | | | | |
| Na | 0.03 | | | | |

NUMEC analyses of the as-supplied enriched boron and Table I for the certified analysis results of the virgin 304 stainless. Scrap resulting from turning or from rejected plates was remelted and converted into useful alloy.

The virgin boron powder (<100 micron particle size) was weighed to the nearest 0.1 gram encapsulated in a 10 mil mild steel can and placed in the bottom of a 200 lb. steel capacity commercial grade MgO crucible. The virgin stainless and/or scrap was weighed to the nearest 0.1 lb. and placed on top of the encapsulated boron. Although the crucible had a 200 lb. stainless steel capacity, the low bulk density of the virgin boron limited the charge to approximately 140 lbs.

Table II below shows the make up of Melts Nos. 1 through 21 produced.

TABLE II (All wgts. in grams)

| Melt No. | Charge Composition w/o | Charge Composition w/o B-10 | Wgt Virgin B | Wgt Virgin B-10 | Wgt Alloy Scrap | Wgt B in Scrap | Wgt B-10 in Scrap | Wgt Virgin S.S. | Charge Wgt |
|---|---|---|---|---|---|---|---|---|---|
| 1 | 2.09 | 1.90 | 1448.88 | 131989 | — | — | — | 67918. | 70656.8 |
| 2 | 1.97 | 1.79 | 870.13 | 792.40 | 19658. | 399.68 | 363.61 | 43.856 | 64384.1 |
| 3 | 1.99 | 1.80 | 1230.47 | 1109.87 | 8399. | 167.98 | 153.70 | 60563. | 70192.5 |
| 4 | 1.99 | 1.79 | 1219.78 | 1098.77 | 10308.5 | 196.81 | 177.31 | 59610. | 71138.3 |
| 5 | 1.93 | 1.76 | 1120.44 | 1019.73 | 12258.0 | 234.24 | 212.01 | 56704. | 70082.4 |
| 6 | 1.96 | 1.79 | 1071.11 | 982.49 | 11804.0 | 226.57 | 205.00 | 53299. | 66174.1 |
| 7 | 2.03 | 1.83 | 624.32 | 562.01 | 34549.4 | 675.72 | 609.20 | 28829. | 64002.7 |
| 8 | 2.06 | 1.88 | 74.4 | 67.0 | 65875.4 | 1287.81 | 1172.17 | — | 65949.8 |
| 9 | 2.11 | 1.91 | 104.6 | 94.2 | 59493.0 | 1147.39 | 1037.49 | — | 59297.6 |
| 10 | 2.06 | 1.86 | 215.16 | 193.69 | 52391.6 | 1048.92 | 950.05 | 8716.0 | 61322.7 |
| 11 | 2.09 | 1.89 | 491.79 | 442.71 | 38771.6 | 794.44 | 719.17 | 22064.4 | 61327.8 |
| 12 | 2.06 | 1.86 | — | — | 60155.0 | 1239.21 | 1118.97 | — | 60155.0 |
| 13 | 2.00 | 1.82 | — | — | 64422.6 | 1293.45 | 1174.29 | — | 64422.6 |
| 14 | 2.00 | 1.82 | — | — | 64331.8 | 1286.64 | 1170.83 | — | 64331.8 |
| 15 | 2.01 | 1.82 | — | — | 41858.8 | 841.90 | 764.21 | — | 41858.8 |
| 16 | 1.97 | 1.79 | — | — | 47624.6 | 942.86 | 853.87 | — | 47624.6 |
| 17 | 1.99 | 1.80 | — | — | 59655.5 | 1189.31 | 1077.01 | — | 59655.6 |
| 18 | 1.96 | 1.77 | — | — | 58929.2 | 1156.50 | 1045.69 | — | 58929.2 |
| 19 | 1.97 | 1.78 | — | — | 62288.8 | 1227.6 | 1114.9 | — | 62288.8 |
| 20 | 1.93 | 1.75 | — | — | 30554.2 | 592.02 | 536.34 | — | 30554.2 |
| 21 | 1.92 | 1.74 | — | — | 33958.1 | 604.23 | 593.94 | — | 33958.1 |

The boron is supplied in the form of a powder which would be partially dissipated during the evacuation of the furnace if charged directly into the furnace. In accordance with an aspect of this invention, the boron powder is enclosed in a thin can of mild steel and the can is placed in the furnace. Typically, about 140 pounds of 304 steel and about 3 pounds of boron powder are deposited and the effect of the mild steel of the can is negligible. Specifically, the charge material consisted of certified 304 stainless steel 3 inch diameter bar and 90 percent purity-90 percent enriched B-10 produced by the boron facility at Niagara of Nuclear Materials And Equipment Corp. (NUMEC). Two of the five supplied lots were analyzed by NUMEC for total boron prior to production and were found to agree with the shipper certification within the accuracy limits for the analysis. See Table IA for the Niagara and The following Table III presents the actual analyzed alloy composition of typical melts produced by melting the stainless steel having the composition shown in the second column of Table I and the boron having the above tabulated composition.

TABLE III

| Melt No. | B | C | Mn | P | S | Si | Ni | Cr |
|---|---|---|---|---|---|---|---|---|
| 4 | 1.87 | .15 | 1.45 | .016 | .016 | .62 | 8.92 | 17.39 |
| 12 | 2.04 | .12 | 1.50 | 0.17 | .014 | .65 | 8.70 | 17.59 |
| 8 | 2.03 | .12 | 1.47 | .017 | .016 | .59 | 8.80 | 17.23 |
| 2 | 1.93 | .13 | 1.53 | .017 | .016 | .54 | 9.03 | 17.13 |
| 1 | 2.00 | .13 | 1.35 | .017 | .015 | .58 | 9.25 | 17.60 |

For each row the remainder is iron. There was no analysis for Mo, Co and Cu.

The melt is cast in molds to produce billets or slabs having a thickness of about 1.3 inches. The billets are then sand-blasted, trimmed and coated with the adhesion-preventing wash coating which may be zirconia.

The coated slabs are then encased in cladding of mild steel. The cladding is produced in the form of a frame with separate cover plates. The opening in the frame is dimensioned so that a slab is sliding fit in the opening. The thickness of the frame is about the same as the initial thickness of the slab. The plates are typically 12 gauge sheet. One plate is seal welded to the frame. Then the coated slab is inserted and the other plate is seal welded.

The composite pack is then reduced by hot rolling. The pack is repeatedly heated to 1125°C. ± 50°C. and then rolled.

The following Table IV presents a flow diagram of typical practice of the process.

AISI 304 or 304L steel may be used. The rods 19 may have a weight of 150 pounds.

The crucible may be disposed in an induction heater 21 having induction heating coils 23 embedded in insulation. The heating coils 23 may be energized from an INDUCTOTHERM 100 Kw motor generator set delivering power at about 4000 cycles per second. The furnace 21 and its contents are disposed in a chamber 25

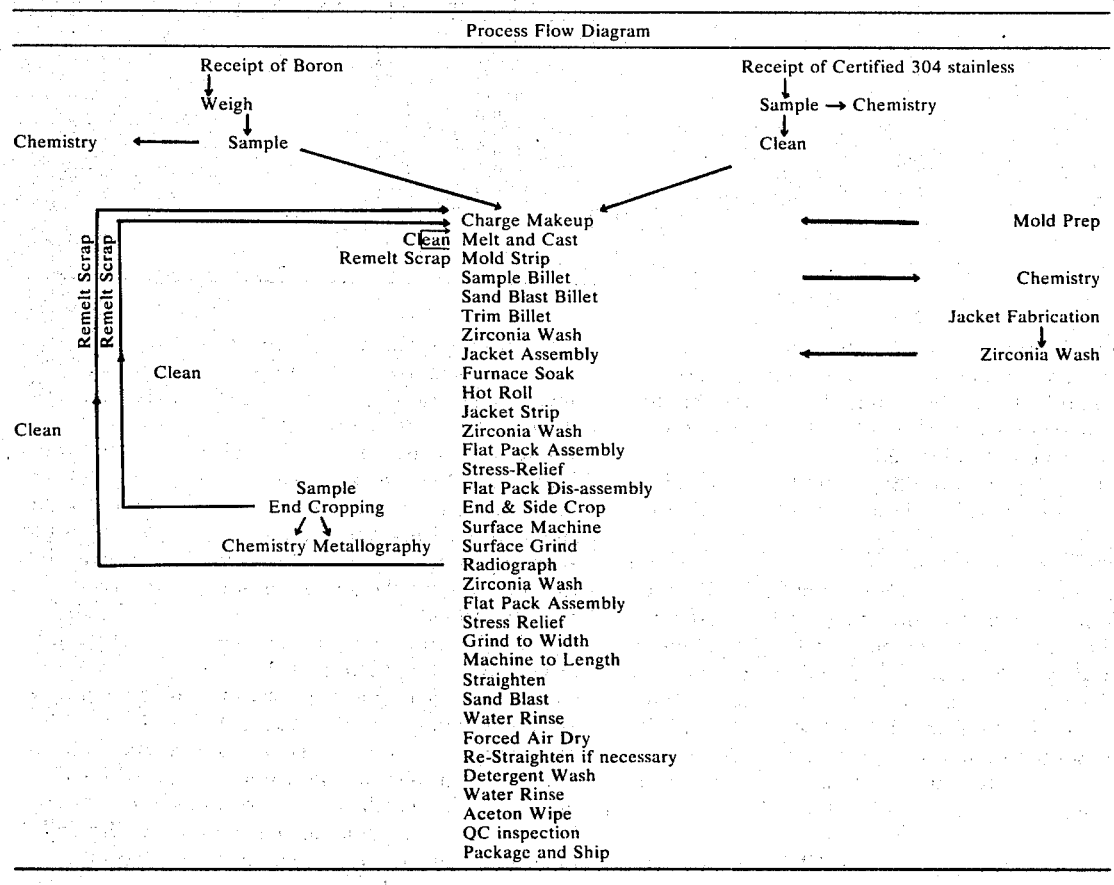

Table IV — Process Flow Diagram

Study of typical sheets produced in this way has shown them to be free of end cracks and to have uniform boron distribution throughout. Contamination of the shop by boron during rolling is eliminated.

For a better understanding of this invention, both as to its organization and as to its method of operation, together with additional objects and advantages thereof, reference is made to the following description taken in connection with the accompanying drawings.

Figure 1:
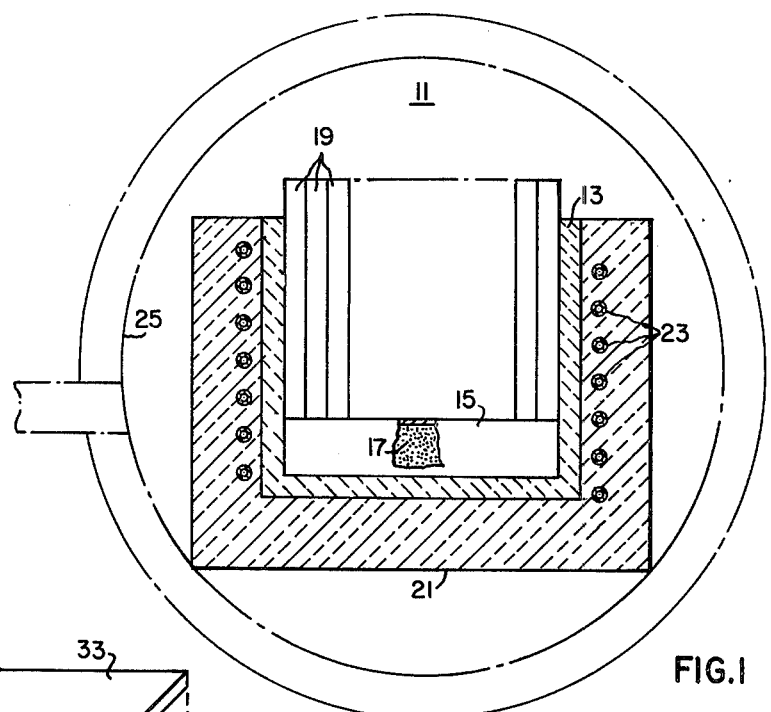
FIG. 1 is a diagrammatic view of apparatus used in producing the alloy with which this invention is practiced.
Figure 2:
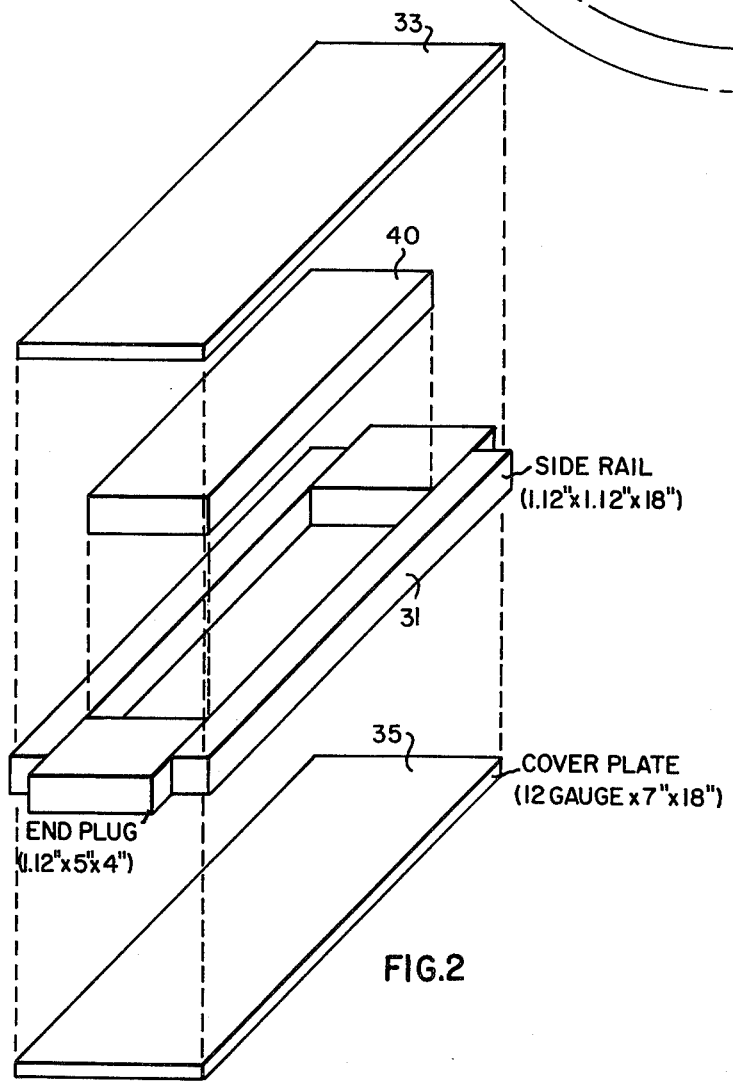
FIG. 2 is an exploded view showing the cladding parts of the pack according to this invention.
Figure 3A:
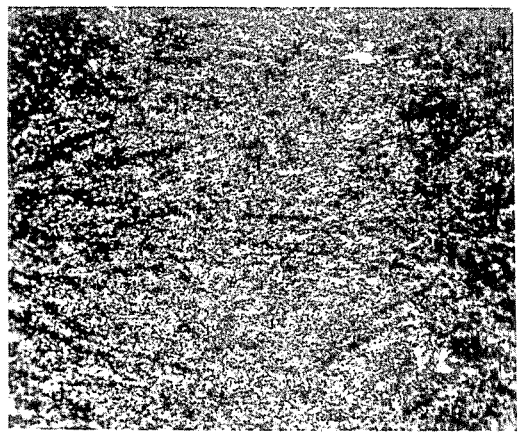
FIGS. 3a, b, c, d, e and f are photo-micrographs at 200 magnification of cuts of sheets produced in the practice of this invention.
Figure 3B:
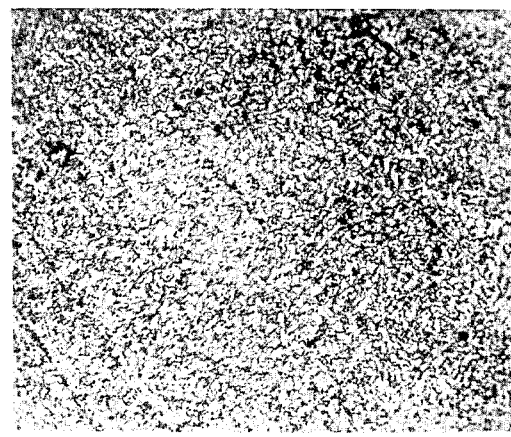
Figure 3C:
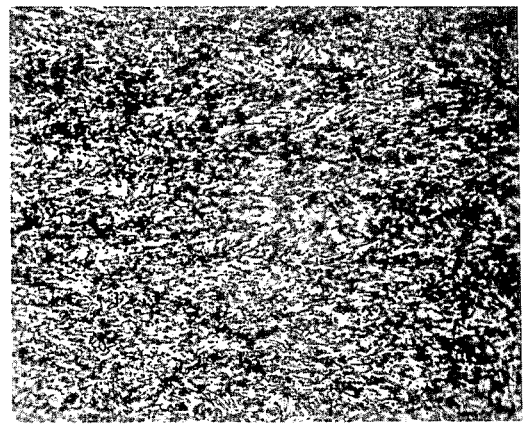
Figure 3D:
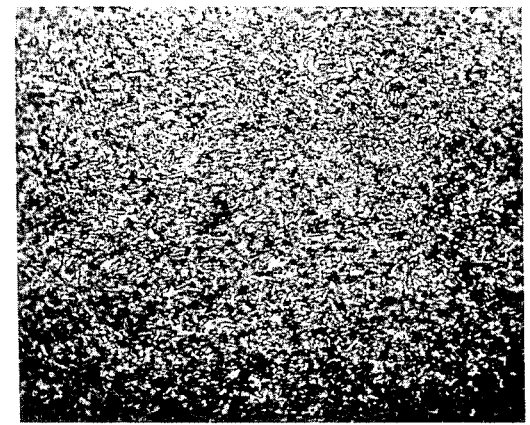
Figure 3E:
Figure 3F:
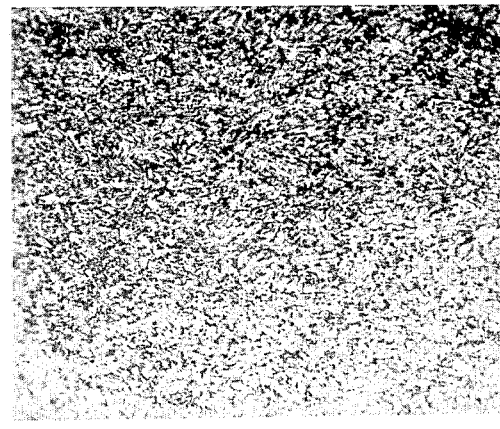

The apparatus shown in FIG. 1 is a vacuum furnace 11 which typically may be bought from Stokes Vacuum Furnace Co. This furnace 11 includes a crucible 13 in the base of which a can 15 containing powder 17 enriched to 90% B-10 is enclosed. The can may be composed of mild steel and may contain typically about 3 pounds of powder. Upon the can, but within the crucible rods 19 of stainless steel are disposed. Typically which may be evacuated by adequate pumping equipment not shown.

In producing the boron stainless steel the following typical procedure is followed:

a. The furnace chamber 11 is evacuated to <5 microns.
b. The chamber is backfilled with argon to a negative 5 inches of mercury.
c. The power is applied and slowly increased (~1 kw per minute) to prevent thermal shock to crucible. Maximum power is approxiimately 55 kw. Melting temperature is approximately 1250°C. Time for complete melting is about 1 hour after reaching full power.
d. After melting, the temperature is increased to ~1300°C. and held at this temperature for 15 minutes.
e. The power is turned off and the melt outgassed by evacuating the chamber to <5 microns.
f. The chamber is backfilled with argon to a negative 5 inches of mercury.
g. The power is turned on and the melt temperature raised again to ~1300°C.
h. Once 1300°C. is reached the melt is cast into cold graphite molds.

UNITED STATES PATENT OFFICE
CERTIFICATE OF CORRECTION

PATENT NO. : 3,955,972
DATED : May 11, 1976
INVENTOR(S) : Gary E. Miller

It is certified that error appears in the above-identified patent and that said Letters Patent are hereby corrected as shown below:

Claim 1, line 6 after "steel" insert ...less....

Signed and Sealed this

Sixteenth Day of November 1976

[SEAL]

*Attest:*

RUTH C. MASON
*Attesting Officer*

C. MARSHALL DANN
*Commissioner of Patents and Trademarks*